Figure 1:
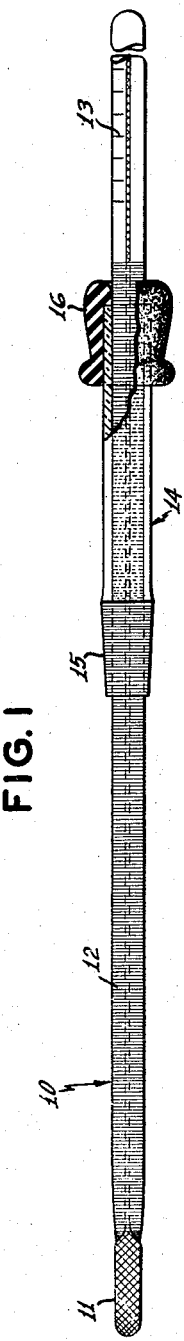

March 16, 1954  W. O. GEYER  2,672,053

THERMOMETER COMBINED WITH FLASK ADAPTER

Filed July 11, 1952

INVENTOR
William O. Geyer
BY
Pennie Edmonds Morton Barrows & Taylor
ATTORNEYS

Patented Mar. 16, 1954

2,672,053

UNITED STATES PATENT OFFICE 2,672,053

THERMOMETER COMBINED WITH FLASK ADAPTER

William O. Geyer, Bloomfield, N. J., assignor to Scientific Glass Apparatus Co., Inc., Bloomfield, N. J., a corporation of New Jersey Application July 11, 1952, Serial No. 298,269

7 Claims. (Cl. 73—343)

This invention relates to thermometers for use in laboratory heating and distilling operations and is concerned more particularly with a novel thermometer assembly, which includes an immersion thermometer and is capable of use for indicating the temperature of either the boiling liquid or the vapor above the liquid in flasks of different sizes.

In heating and distilling operations in the laboratory, it is common to make use of a flask having an orifice, through which a thermometer may be inserted, and the orifice frequently has an internal ground tapered seat. The thermometer then used has an enlarged section between its bulb and the lower end of the scale and the outer surface of the enlarged section is ground and tapered, so that the section will fit into the orifice seat with a tight fit. With such an arrangement, the position of the bulb end of the thermometer within the vessel depends on the form of the thermometer and, if the thermometer has such a length between its exterior seating surface and its bulb, that, when the thermometer is in place, its bulb lies within the liquid being heated in the vessel, the thermometer cannot be used to indicate the temperature of the vapor above the liquid. For this purpose, the thermometer first used must be removed and replaced by another of appropriate form. Also, a thermometer suitable for measuring the temperature of the liquid in a vessel of one size is not suitable for similar use in a vessel of a substantially different size. As a result, it is usual for a well-equipped laboratory to have on hand thermometers of as many as nine different sizes for use in the operations described.

The present invention is directed to the provision of a thermometer assembly, which serves the purpose of a number of thermometers of different sizes and may be employed with vessels, such as flasks, of a wide range of sizes. The new assembly may be used in indicating the temperature of either the liquid within the flask or the vapor above the liquid and the adjustment of the assembly from liquid temperature indication to vapor temperature indication and vice versa may be easily made and without removing the assembly from the vessel.

The new assembly includes a thermometer of the capillary tube type, which is provided with a blank section extending a substantial distance along the stem from the bulb end and a scale beyond the blank section. A sleeve shorter than the blank section encircles that section and the sleeve is provided with an exterior seating surface of a form corresponding to that of the internal seating surface of the vessels with which the assembly is to be used. Resilient means are provided for holding the thermometer and sleeve against relative movement, but the thermometer and sleeve may be manually moved lengthwise of each other against the holding action of the resilient means. Accordingly, when the assembly is to be used to measure the temperature of the liquid to be heated in a flask of a given size, the thermometer is adjusted in position in the sleeve, so that, when the sleeve is seated in the orifice of the flask, the thermometer will project the desired distance below the sleeve and into the flask. When it is then desired to measure the vapor temperature, the thermometer is raised through the sleeve against the holding action of the resilient means and, when the thermometer is released, the resilient means hold it in its new position.

Figure 2:
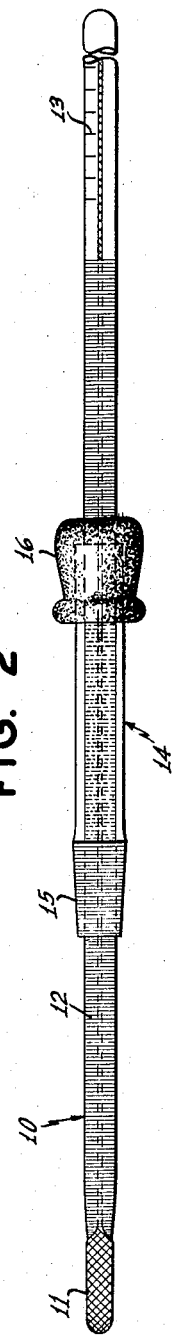
Figure 3:
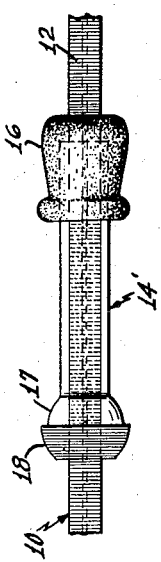

For a better understanding of the invention, reference may be made to the accompanying drawing, in which Fig. 1 is a view in side elevation, with parts broken away, of a thermometer assembly of the invention;

Fig. 2 is a view in side elevation of the new assembly with the parts in relative positions different from those of the parts in Fig. 1; and Fig. 3 is a fragmentary side elevational view of a modified form of the assembly.

The thermometer assembly, as illustrated in Fig. 1, comprises a thermometer 10 of the glass capillary tube type having the usual bulb 11 at one end. Adjacent the bulb end, the tube or stem has a blank section 12, the outer surface of which may be ground, if desired, and, beyond the blank section, the stem is provided with the usual scale 13.

A tubular glass sleeve or adapter 14 encircles the blank section 12 of the thermometer stem and the sleeve is shorter than that section. The sleeve has a sliding fit on the stem, so that it can be readily moved lengthwise of the stem to different positions. At its end adjacent the bulb 11 of the thermometer, the sleeve is formed with an exterior seating surface 15 which, in the construction shown, is of tapering diameter toward the end of the sleeve and is ground, so that the surface will make a tight fit with the internal seating surface of a vessel, with which the thermometer assembly is to be employed. The other end of the sleeve is tightly enclosed by a cap 16 of resilient material, such as rubber, having a central opening, through which the stem of the thermometer extends. The diameter of the opening is such that the cap fits the thermometer stem tightly, although the thermometer and sleeve may be manually moved lengthwise relative to one another. In such movement, the cap is retained on the sleeve.

In the use of the thermometer assembly described, the sleeve is adjusted lengthwise of the thermometer stem to a position such that, when the assembly is mounted in the opening of a vessel with the seating surface on the sleeve engaging that on the vessel, the bulb of the thermometer will be in the desired position within the vessel, that is, beneath the surface of the liquid contents or within the vapor space above the liquid. Assuming that the assembly is to be used first to determine the temperature of the liquid, the sleeve will be positioned adjacent the end of the blank section 12 of the stem remote from the bulb and the assembly then placed in position on the vessel. If, thereafter, it is desired to measure the temperature of the vapor within the vessel above the liquid, the user slides the thermometer upwardly through the stem and cap to the desired position without removing the stem from the vessel. The cap makes a tight fit with the stem at the upper end of the sleeve and is drawn more tightly against the stem in operations in which there is a partial vacuum within the vessel. Thus, it effectively closes the space between the outer end of the sleeve and the thermometer.

The construction shown in Fig. 3 is similar to that above described, except that the sleeve 14' is provided at its end toward the bulb end of the thermometer with an enlargement 17 and the outer end of the enlargement is formed with a ground exterior seating surface 18 of spherical curvature. This form of the assembly is for use in vessels in which there is an internal spherical seating surface.

As will be apparent from the foregoing, the new assembly may be used to measure either the temperature of the liquid within a vessel or that of the vapor above the liquid, and the assembly may be adjusted for the two different measurements without removing it from the vessel. By the use of sleeves having external seating surfaces of different dimensions, it is possible to use a single thermometer in flasks having orifice seating surfaces of different size and one of the new assemblies may be employed in substitution for a number of separate thermometers of different form.

I claim:

1. A thermometer assembly which comprises a thermometer of the capillary-tube type having a portion of uniform cross-section extending a substantial distance of the length thereof, a sleeve shorter than the length of the thermometer encircling said portion of uniform cross-section, the bore of said sleeve corresponding in cross-section to the cross-section of said portion and being sufficiently larger than said portion to permit ready sliding movement of the sleeve along said portion, an exterior seating surface on the sleeve shaped to be inserted into and engage the neck of a flask, and resilient means engaging the sleeve and the thermometer and normally holding them against relative lengthwise movement, the thermometer being manually movable lengthwise of the sleeve against the holding action of the resilient means.

2. A thermometer assembly as defined in claim 1 in which the resilient holding means is a resilient collar carried by the sleeve and engaging the thermometer.

3. A thermometer assembly as defined in claim 1 in which the resilient means is a cap carried by the end of the sleeve remote from the thermometer bulb having a central opening through which the thermometer extends, and the cap forms a closure for the space between that end of the sleeve and the thermometer.

4. A thermometer assembly as defined in claim 1 in which the portion along which the sleeve is adapted to slide is blank and the thermometer scale is beyond said blank portion.

5. A thermometer assembly as defined in claim 1 in which the seating surface is adjacent the end of the sleeve closest the bulb of the thermometer.

6. A thermometer assembly as defined in claim 1 in which the seating surface on the sleeve is ground, is at the end of the sleeve closest the bulb of the thermometer, and is tapered.

7. A thermometer assembly as defined in claim 1 in which the seating surface on the sleeve is ground, is at the end of the sleeve closest the bulb of the thermometer, and is of spherical curvature.

WILLIAM O. GEYER.

References Cited in the file of this patent

UNITED STATES PATENTS

| Number | Name | Date |
|---|---|---|
| 1,935,784 | Smith | Nov. 21, 1933 |
| 2,052,713 | Juffa | Sept. 1, 1936 |
| 2,405,532 | Todd | Aug. 6, 1946 |
| 2,464,546 | Albright | Mar. 15, 1949 |
| 2,535,856 | Luertzing | Dec. 26, 1950 |

FOREIGN PATENTS

| Number | Country | Date |
|---|---|---|
| 210,361 | Switzerland | July 15, 1940 |

OTHER REFERENCES

Analytical Chemistry, vol. 20, #10, October 1948, page 959.

Simons, J. H., Industrial & Engineering Chemistry, Analytical edition, vol. 10, #1, 1938, page 29.